H. J. HARRIES.
MOTOR CONTROLLER.
APPLICATION FILED OCT. 12, 1914.
1,324,194.
Patented Dec. 9, 1919.
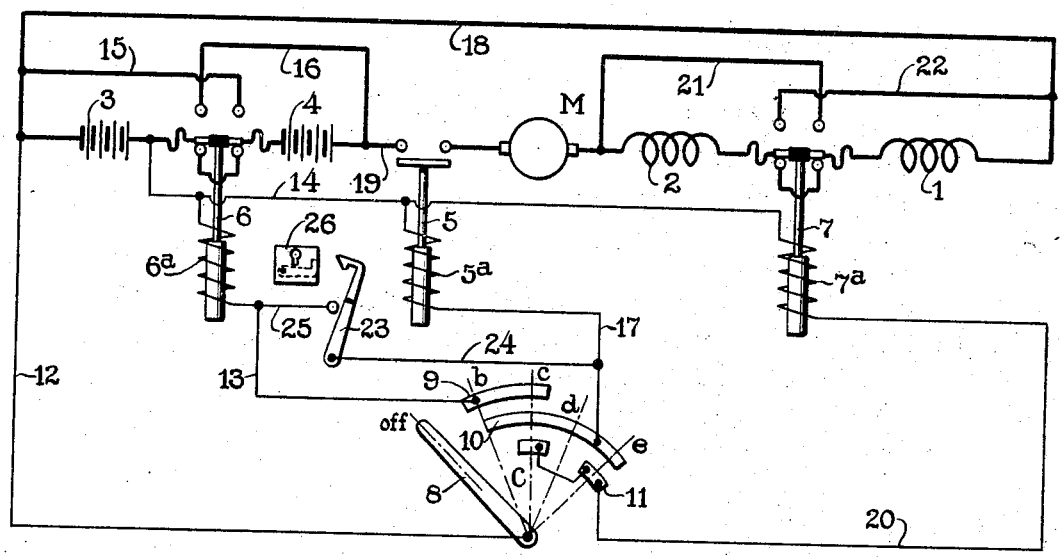

UNITED STATES PATENT OFFICE.

HERBERT J. HARRIES, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR-CONTROLLER.

1,324,194.   Specification of Letters Patent.   Patented Dec. 9, 1919.

Application filed October 12, 1914. Serial No. 866,417.

*To all whom it may concern:*

Be it known that I, HERBERT J. HARRIES, a citizen of the United States, residing at Milwaukee, in the county of Milwaukee and State of Wisconsin, have invented new and useful Improvements in Motor-Controllers, of which the following is a full, clear, concise, and exact description, reference being had to the accompanying drawing, forming a part of this specification.

This invention relates to motor controllers and is designed more particularly for electric motor vehicles.

Operation of such vehicles is commonly controlled by a master device capable of varying the circuit connections, for example by battery or field commutation, or both, to regulate the running speed.

This invention has among its objects to provide means whereby the effectiveness of such controllers may be curtailed to insure against unauthorized or careless operation of the vehicle by garage employees or others entrusted with the general care of the machine.

A further object is to provide means which may be locked independently of the master controller to render the latter ineffectual to establish high speed circuit connections.

Other objects and advantages will be in part obvious and in part pointed out hereafter in connection with a description of a diagrammatic representation of the invention shown in the accompanying drawing, wherein, The figure is a diagrammatic view of a control system for electric motor vehicles.

Referring more specifically to the drawing, there is shown a driving motor M having series fields 1 and 2 and a source of current supply comprising batteries 3 and 4. A master controller C is provided to govern the circuit connections of the elements enumerated and is arranged to control the motor circuit through the medium of an electro-responsive switch 5, to effect either series or parallel connection of the batteries by an electro-responsive switch 6, and also to effect either series or parallel connection of the fields by a third electro-responsive switch 7. The controller C, as represented, comprises a pivoted arm 8 connected to one pole of the batteries and arranged to engage stationary contact segments 9, 10 and 11, when operated, for effecting operation of the switches 5, 6 and 7 respectively, as follows:

Movement of the arm 8 from "off" position to position "$b$" completes circuit from battery 3 by conductor 12 to contact 9, by conductor 13 through coil winding $6^a$ of switch 6 and by conductor 14 to the other pole of the battery. Switch 6 thereupon responds and establishes parallel connection for the batteries by conductors 15 and 16 as will be obvious. Momentarily thereafter the control arm 8 engages segment 10 and makes circuit by conductor 17 to winding $5^a$ (of switch 5) and by conductor 14 as traced. The switch 5 then operates to close the motor circuit from the batteries, now in parallel, by conductor 18 through the fields 1 and 2 in series, across the motor and switch 5 and by conductor 19 to the batteries. The second step of the motor speed is effected by movement of the control arm 8 to its third position "$c$" for engaging segment 11 and energizing winding $7^a$ by conductors 20 and 14. Switch 7 is thereupon moved to break the series connections of the fields 1 and 2 and establish the same in parallel by conductors 21 and 22, it being understood that such commutation may be effected in various different ways without interruption of the continuity of the motor circuit. The field strength is thus weakened and acceleration of the motor obtained to a definitely increased stage. By the two circuits described and by suitable starting means, such as armature resistance (not shown) it will be observed that the starting and slow speed drive of the vehicle is effected, and it is to be noted that under both of these conditions the batteries 3 and 4 are connected in parallel.

Two further steps in motor speed are obtainable by the controller as follows:

Movement of the arm 8 to fourth position "$d$" maintains switch 5 closed, but breaks circuit to both windings $6^a$ and $7^a$ so that the respective switches drop and restore both the batteries and the fields to series. Finally operation of the controller to extreme position "$d$" again energizes winding $7^a$ and thereby again connects the fields in parallel.

With a control system of which that described is typical, I now provide means whereby the vehicle may be locked in a condition which renders the controller C ineffectual to establish other than the low speed circuit connections. As illustrated this means comprises a manually operable switch 23 arranged to connect contact 10, by conductors 24 and 25, with switch winding 6ª so that energization of said winding is insured in all operative positions of the movable arm 8. Moreover, said switch 23 is of a character to enable positive key locking when desired by a locking device 26. It will be apparent therefore that, with the switch 23 closed, movement of the control arm 8 to positions "d" and "e" now merely operates to connect the batteries in parallel and the fields in series ("d") or the batteries in parallel and the fields in parallel ("e"). The capabilities of the controller C are thus curtailed and operation of the vehicle positively restricted to slow driving speeds.

Any extreme or unauthorized use of the vehicle is thus effectually prevented, and at the same time, necessary operation of the car for battery recharging and other care is, of course, permitted.

What I claim as new and desire to secure by Letters Patent is:—

1. In a motor controller, in combination, means controlling a plurality of circuits to afford a given range of speed control of the motor, and lockable means for modifying certain of such circuits to curtail the range of speed control afforded by said first mentioned means.

2. In a motor controller, in combination, a plurality of electro-responsive switches to effect operation of the motor at different speeds, a master controller for said switches and lockable means to vary the circuit connections between certain of said switches and said controller to curtail the range of speed variation effectible by said controller.

3. In a motor controller, in combination, a plurality of switches for varying the speed of the motor, control means therefor including a member movable to effect variation of the motor speed through a given range and lockable means associated with said control means to curtail such range of speed control without curtailing the movements of said member.

4. In a motor controller, in combination, a master controller, electro-responsive switches controlled thereby to afford variation of the motor speed through a given range and a switch for varying the control connections of certain of said electro-responsive switches to insure against utilization thereof for speed variation without curtailing operation of said master controller.

5. In a motor controller, in combination, a motor, supply batteries therefor, means including a movable member to connect said batteries in parallel for a certain range of speed of said motor and for connecting said batteries in series for a higher range of speed of said motor and lockable means for rendering said first mentioned means ineffective to connect said batteries in series without curtailing operation of said member.

6. In a motor controller, in combination, a motor, supply batteries therefor, control means including a movable member for effecting speed regulation of said motor by commutation of said batteries and by other circuit variations and lockable means to restrict said regulation by rendering said means incapable of effecting battery commutation during operation of said motor without curtailing operation of said member.

7. In a motor vehicle controller, in combination, means including a movable member having a plurality of positions to effect speed regulation by a plurality of circuit variations, and lockable means to curtail the number of circuit variations effectible by said first mentioned means without curtailing the operation of said member.

8. In a motor controller, in combination, speed regulating means including an electro-responsive switch adapted to be energized for establishing one circuit and to be deënergized for establishing another circuit, a master controller for effecting energization and deënergization of said switch, and lockable means to render said controller ineffective for deënergizing said switch during motor operation.

In witness whereof I have hereunto subscribed my name in the presence of two witnesses.

HERBERT J. HARRIES.

Witnesses:
H. WATSON,
TEKLA BAST.